Patented Nov. 6, 1951

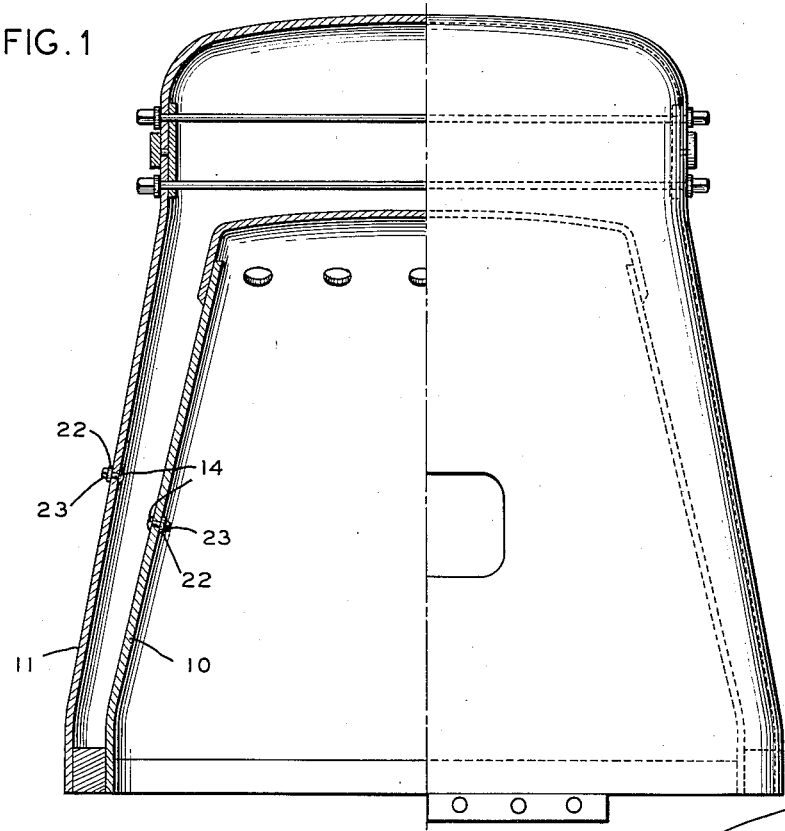
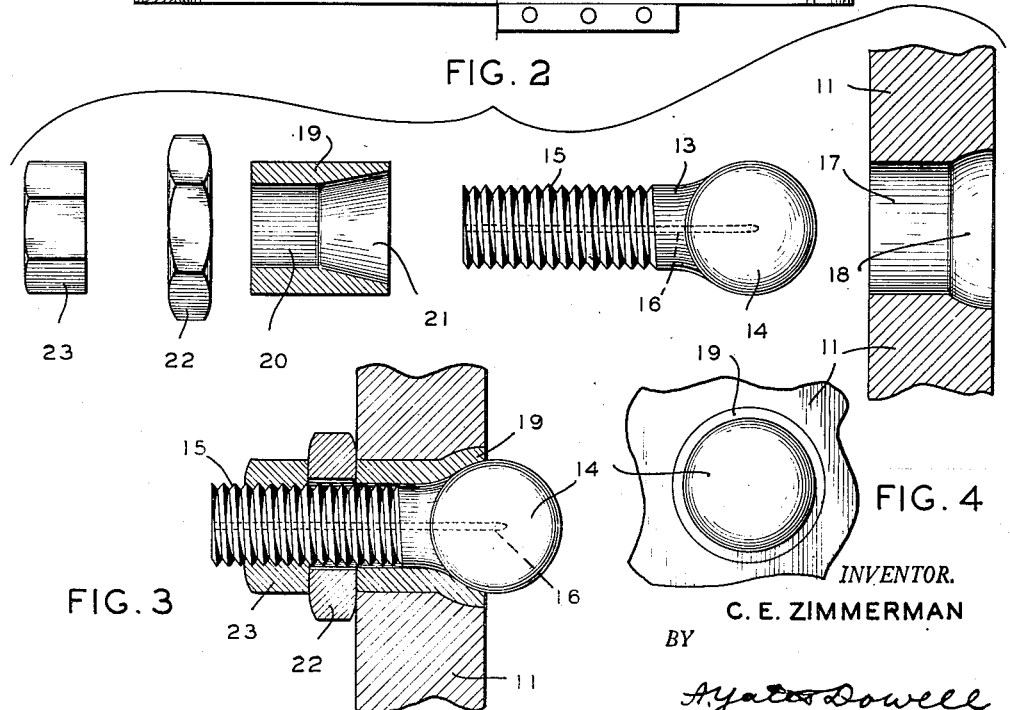
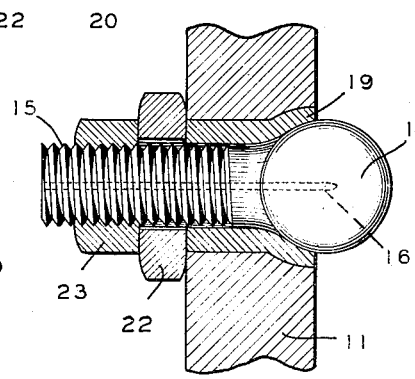

2,574,160

UNITED STATES PATENT OFFICE 2,574,160

PLUG

Chester E. Zimmerman, Baltimore, Md.

Application November 29, 1946, Serial No. 712,857

1 Claim. (Cl. 220—24.5)

This invention relates to pressure vessels in which it is desired to maintain confined fluids in gaseous or liquid state.

More particularly the invention relates to the closing of a hole to prevent leakage in the wall of the pressure vessel to which access can only be had from one side of such wall on the exterior of the vessel.

Heretofore repairing holes in the walls of pressure vessels has been accomplished by tapping the holes and inserting screw plugs therein. When stopping holes in this manner it has sometimes been necessary for the plugs to be removed, and this frequently resulted in damage to the holes to the extent that they had to be retapped and new screw plugs used. This increased the possibilities of leakage as well as increasing the surface area within the pressure vessel subjected to rust or corrosion.

It is an object of the invention to provide a simple, inexpensive, efficient plug for closing an opening in the wall of a pressure vessel and which plug can be easily applied, removed and reapplied without injury to the pressure vessel and with only a small amount of the plug within the interior of the pressure vessel exposed and subject to corrosion.

Further objects and advantages of the invention will be apparent from the following description taken in conjunction with the accompanying drawings, wherein:

Fig. 1 is a section illustrating the application of two plugs, in accordance with the present invention, applied for purposes of illustration to the water leg of a locomotive boiler;

Fig. 2, an exploded view;

Fig. 3, an enlarged detailed section of the plug applied; and

Fig. 4, an elevation of the plug in operative position looking from the inaccessible side of the plate.

With further reference to the drawings, the water leg of a locomotive boiler is provided with inner walls 10 and outer walls 11 between which water, steam or other fluid is contained and at a relatively high temperature. Although the water leg of a boiler is disclosed for purposes of illustration, the invention is applicable to any other type of pressure vessel including the boiler of a household furnace, a steam or hot water radiator, or any other pressure vessel where it is impossible and impractical to insert a plug from the interior.

Holes in the walls 10 and 11 are closed by means of plugs in accordance with the present invention. These plugs each include a steel ball pin or stud 13 having a substantially spherical head 14 and a threaded shank 15. Also the stud is provided with a central drill opening or channel 16 permitting leakage to the exterior similar to a conventional stay bolt for indicating that the bolt has become sufficiently ineffective that fluid within the vessel can escape and be observed on the exterior.

A hole in the wall 11 is preferably reamed out so that it has a substantially cylindrical portion 17 and a slightly enlarged portion 18. The cylindrical or smaller portion 17 is slightly larger than the diameter of the spherical head 14 of the stud so that such head can be easily inserted through the wall. A sleeve 19, preferably of brass or slightly softer material than the steel or other hard substance of which the stud is formed, has a cylindrical bore 20 and a flared end portion 21. The sleeve is of a length slightly greater than the length of the combined portions 17 and 18 of the opening in the wall 11 and is of an external diameter which will permit the sleeve to be inserted in the hole in the wall with a snug fit. The sleeve 19 is applied to the shank of the stud with the flared end of the sleeve extending slightly over the portion of the spherical head of the stud and with a lock nut 22 and a hex nut 23 engaging one end of the sleeve and forcing its opposite flared end against the head of the stud. When force is applied to the nuts the spherical head of the stud will be forced into the flared end of the sleeve and cause expansion of the latter.

In closing the opening in the wall of the pressure vessel the sleeve is applied to the stud so that the flared end of the sleeve engages the spherical head of the stud. The nuts are then threaded onto the shank of the stud until they engage the rear or unflared end of the sleeve. With the parts thus assembled the head of the stud is pushed through the cylindrical portion of the hole in the plate until the lock nut engages the plate. The flared end of the sleeve will then extend slightly beyond the plane of the surface of the plate in which the flared portion 18 of the opening is located. Thereupon by applying pressure and rotating the nuts 22 and 23 on the threaded shank 15 of the stud, the head 14 will be caused to ride in the flared end 21 of the sleeve and expand the sleeve so that it closely conforms in external configuration to the internal configuration of the opening 18 in the plate as shown particularly in Fig. 3. In view of the soft character of the material of the sleeve the hole in the plate will therefore be effectively sealed against leakage therethrough.

It will be readily understood that in closing the hole in the plate all the parts for closing the same are insertable from one side of the plate, and it is unnecessary that access be had to the opposite side of the plate.

It will be obvious to those skilled in the art that various changes may be made in the invention without departing from the spirit and scope thereof and therefore the invention is not limited by that which is shown in the drawing and described in the specification but only as indicated in the appended claim.

What is claimed is:

In a device for sealing a hole in a wall, said hole including a cylindrical portion and an enlarged arcuate portion extending from the extremity of the cylindrical portion to the adjacent surface of the wall, a stud having a threaded shank and a substantially spherical head of greater diameter than said shank, a cylindrical sleeve surrounding said stud and snugly fitting within the cylindrical portion of said hole, the length of said sleeve substantially approximating the thickness of said wall, said sleeve being provided with a cylindrical bore terminating in a frusto-conical portion positioned adjacent the enlarged portion of the hole in said wall, the spherical head of said stud engaging said frusto-conical portion, and a nut engaging the threaded shank of said stud and adapted to force said spherical head into the frusto-conical portion of said sleeve to expand said frusto-conical portion into sealing engagement with the enlarged portion of the hole in said wall.

CHESTER E. ZIMMERMAN.

REFERENCES CITED

The following references are of record in the file of this patent:

UNITED STATES PATENTS

| Number | Name | Date |
|---|---|---|
| 614,547 | Haworth | Nov. 22, 1898 |
| 2,070,579 | Brooke | Feb. 16, 1937 |

FOREIGN PATENTS

| Number | Country | Date |
|---|---|---|
| 115,169 | Great Britain | May 2, 1918 |
| 530,016 | Great Britain | Dec. 3, 1940 |